J. Q. ADAMS.
DECOY.
APPLICATION FILED JULY 19, 1921.

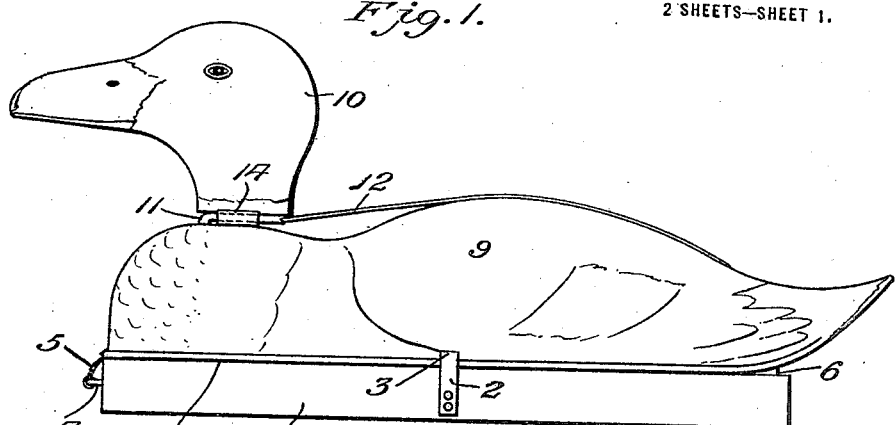
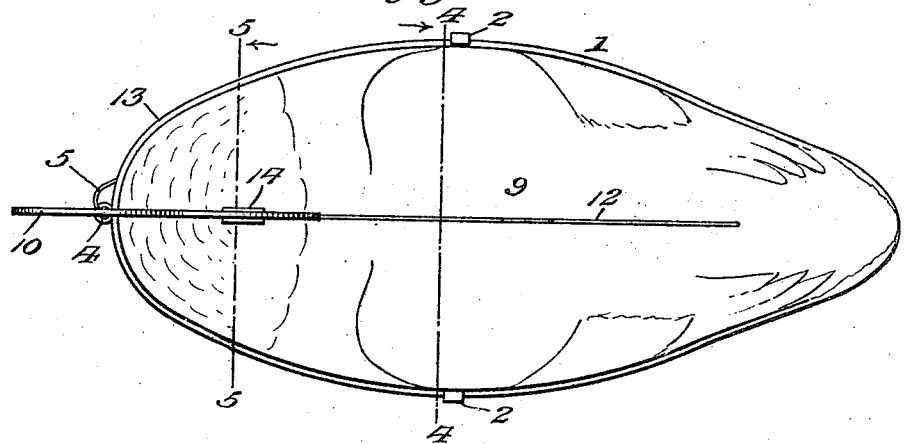
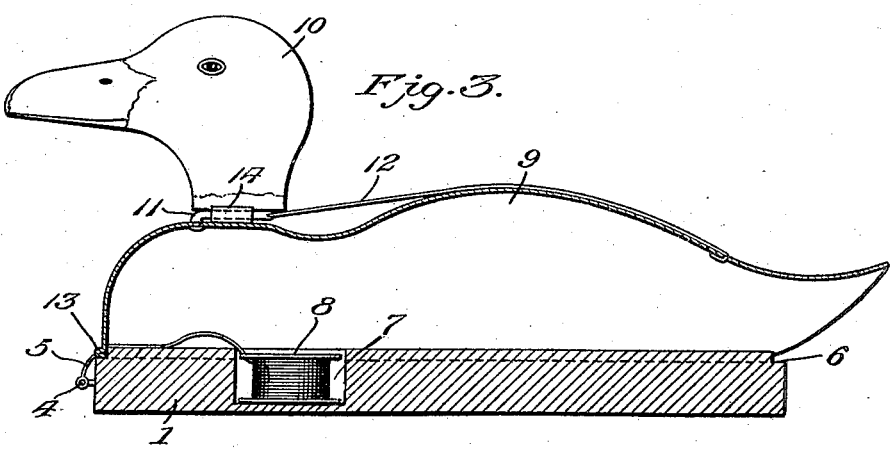

1,417,441.

Patented May 23, 1922.
2 SHEETS—SHEET 2.

John Q. Adams INVENTOR
BY Victor J. Evans ATTORNEY

WITNESSES

UNITED STATES PATENT OFFICE.

JOHN QUINCY ADAMS, OF HICKMAN, KENTUCKY, ASSIGNOR OF ONE-HALF TO WALTER J. McMURRY, OF HICKMAN, KENTUCKY.

DECOY.

1,417,441.           Specification of Letters Patent.      Patented May 23, 1922.

Application filed July 19, 1921. Serial No. 485,313.

*To all whom it may concern:*

Be it known that I, JOHN Q. ADAMS, a citizen of the United States, residing at Hickman, in the county of Fulton and State of Kentucky, have invented new and useful Improvements in Decoys, of which the following is a specification.

One object of my present invention is the provision of a decoy characterized by a profile head associated with the body in such manner that in use the head is maintained rigidly in upright position, and yet when it is desired to pack the decoy the head may be quickly and easily adjusted and laid down, but without disconnection from the body so that the decoy as a whole will occupy but little space.

Another object of the invention is the provision of a decoy comprising a body and a float adapted to be readily connected and disconnected, and also embodying such construction and relative arrangement of parts that when not in use the anchor of the decoy and the anchor cable are stored between the body and the float.

To the attainment of the foregoing, the invention consists in the improvement as hereinafter described and definitely claimed.

In the accompanying drawings, forming part of this specification:—

Figure 1 is a side elevation of the decoy constituting the best practical embodiment of my invention of which I am cognizant.

Figure 2 is a plan view of the same.

Figure 3 is a longitudinal vertical section of the decoy taken in a plane at one side of but adjacent to the point at which the head is held in upright position on the body.

Similar numerals of reference designate corresponding parts in all of the views of the drawings.

Figure 4:
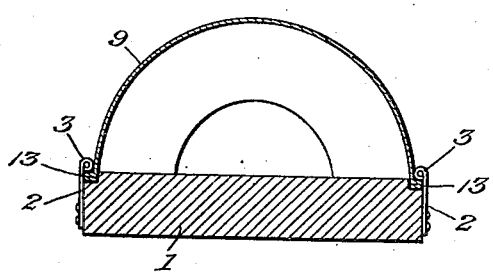
Figure 4 is a transverse section taken in the plane indicated by the line 4—4 of Figure 2, and showing the manner in which the body is detachably held to and on the float.
Figure 5:
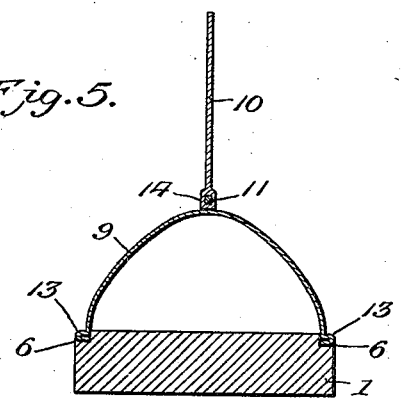
Figure 5 is a transverse section taken in the plane indicated by the line 5—5 of Figure 2 and showing the manner in which the profile head is maintained in upright position on the body.
Figure 6:
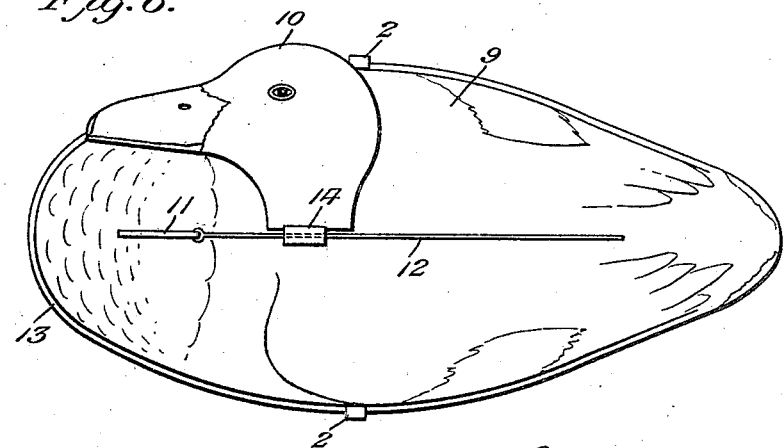
Figure 6 is a plan view showing the profile head as it appears after being shifted rearwardly and swung downwardly on the body without being disconnected from the body as is desirable when the decoy is to be packed for storage or shipment.

Among other elements my novel decoy comprises a float 1, preferably of wood and equipped at opposite sides with resilient catches 2 on the upper free ends of which are rounded heads 3. The float 1 is also equipped at its lower end with an eye 4 for the connection of an anchor cable 5, and at its upper side the float is characterized by a marginal rabbet 6, and in its upper side it has a well 7 to receive the decoy anchor 8, the said anchor being preferably, though not necessarily, of the type illustrated, and being designed when not in use to be removably arranged in the said well 7.

In addition to the float 1 the decoy comprises a body 9 and a head 10, the said head 10 being by preference of profile type. The body 9 is pressed of sheet metal or is otherwise produced of metal or other appropriate material, and is of shell type, being shaped and embellished, when necessary, to simulate a duck or the other bird to be represented.

At the upper side of its forward portion the body 9 is provided with an upwardly and rearwardly reaching bar 11, of angular form in cross section, and between the rear end of the bar 11 and a point on the rear portion of the top of the body 9 is a cable 12, preferably a wire as illustrated. The edge of the body 9 is preferably beaded or otherwise reinforced as indicated by 13 for the sake of stiffness and strength and also to assist the heads of the catches 2 in strongly engaging the body 9 with a view to securely hold it in detachable manner on and to the float 1.

At one end the head 10 which is preferably shaped and embellished, to simulate the head of a duck or other bird, is provided with a sleeve 14, of angular form in cross section and of a relative size to snugly receive the bar 11 when the head is in working position, this with a view to securely maintaining the head in said position. It will be apparent, however, that when it is desired to swing the head 10 down on the body for the sake of compactness in storage and shipment it is simply necessary to move the head rectilinearly in a rearward direction and out of engagement with the bar 11 when the sleeve 14 will be adapted to freely turn on the cable or wire 12 and the head will then be swung down on the body, without, however, being disassociated from the body which is an important advantage inasmuch as it precludes loss or misplacing of the head.

It will be further appreciated from the foregoing that the body 9 is adapted to be expeditiously and easily snapped into and out of engagement with the float, and that when the body 9 is disconnected from the float, the anchor 8 may be readily placed in or removed from the well 7; also, that the cable 5 may be stored within the hollow body 9 and between the same and the upper side of the float.

I have entered into a detailed description of the construction and relative arrangement of parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. The combination in a decoy, of a bar, a body connected with and supporting the bar, said bar spaced from the upper side of the body and being of angular form in cross section, a cable interposed between and connecting one end of said bar and a point on the body remote from the bar, and a head having a slip sleeve, of angular form in cross section, adapted to snugly receive the bar to hold the head in upright position and also adapted to receive the cable when the head is to be swung downwardly on the body.

2. The combination in a decoy, of a body, a head, and a connection between the body and the head embodying means to maintain the head in upright position in one location of the head, and also embodying means to permit of lateral swinging of the head when in another location, without disconnection of the head from the body, the head being movable rectilinearly from one of said locations to the other.

3. The combination in a decoy, of a bar, a body connected with and supporting the bar, said bar spaced from the upper side of the body and being of angular form in cross section, and a head having a slip sleeve, of angular form in cross section movable on and off the said bar.

4. The combination in a decoy, of a float having a marginal rabbet at its upper side, resilient headed catches carried at opposite sides of the float, and a shell type body having a bead removably arranged in the said rabbet of the float and detachably held by the heads of the catches.

In testimony whereof I affix my signature.

JOHN QUINCY ADAMS.